United States Patent
Westrick, Jr. et al.

(10) Patent No.: US 11,160,155 B2
(45) Date of Patent: *Oct. 26, 2021

(54) LIGHTING FIXTURE COMMISSIONING BASED ON POWERLINE SIGNALING TECHNIQUES

(71) Applicant: ABL IP Holding LLC, Atlanta, GA (US)

(72) Inventors: Richard Lee Westrick, Jr., Social Circle, GA (US); Dalibor Zulim, Conyers, GA (US); Marc Saes, Gemert (NL)

(73) Assignee: ABL IP Holding LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,921

(22) Filed: Jul. 6, 2020

(65) Prior Publication Data

US 2021/0100086 A1   Apr. 1, 2021

Related U.S. Application Data

(63) Continuation of application No. 16/589,545, filed on Oct. 1, 2019, now Pat. No. 10,750,601.

(51) Int. Cl.
*H05B 47/19* (2020.01)
*H05B 45/37* (2020.01)

(52) U.S. Cl.
CPC ............ *H05B 47/19* (2020.01); *H05B 45/37* (2020.01)

(58) Field of Classification Search
CPC ...... H05B 45/37; H05B 45/325; H05B 47/16; H05B 47/19; H05B 47/135; H05B 47/175; H05B 47/195
See application file for complete search history.

(56) References Cited

U.S. PATENT DOCUMENTS 7,266,344 B2   9/2007 Rodriguez
7,355,523 B2   4/2008 Sid
(Continued)

FOREIGN PATENT DOCUMENTS

EP   2018795   12/2016

OTHER PUBLICATIONS

U.S. Appl. No. 16/774,475, Notice of Allowance, dated Jul. 13, 2020, 8 pages.
(Continued)

*Primary Examiner* — Tung X Le
(74) *Attorney, Agent, or Firm* — Kilpatrick Townsend & Stockton LLP

(57) ABSTRACT

An intelligent lighting system may be installed using pre-existing electrical wiring, such as in a construction or retrofit environment. An intelligent lighting controller and an intelligent lighting fixture may be connected via electrical wiring that is configured for transmitting AC power signals. A commissioning signal may be transmitted to the intelligent lighting fixtures via the electrical wiring. In some cases, the intelligent lighting controller modifies portions of the AC power signal to indicate the commissioning signal. The intelligent lighting fixtures may receive the commissioning signal via the electrical wiring. In some cases, each intelligent lighting fixture that is connected to the electrical wiring, such as each intelligent lighting fixture on a lighting circuit in a room, receives the commissioning signal.

20 Claims, 6 Drawing Sheets

(56) References Cited

U.S. PATENT DOCUMENTS

| | | | |
|---|---|---|---|
| 8,866,401 B2 * | 10/2014 | Shearer | H05B 47/185 315/247 |
| 9,049,756 B2 | 6/2015 | Klusmann et al. | |
| 9,095,015 B2 | 7/2015 | Welten | |
| 9,320,116 B2 | 4/2016 | Lydecker et al. | |
| 9,544,017 B2 | 1/2017 | Fox et al. | |
| 9,686,840 B2 | 6/2017 | Lydecker et al. | |
| 9,736,914 B2 | 8/2017 | Pakkala et al. | |
| 9,832,842 B2 | 11/2017 | Lydecker et al. | |
| 9,838,008 B2 | 12/2017 | Lark, Jr. et al. | |
| 9,883,564 B2 | 1/2018 | Ciccarelli et al. | |
| 9,887,053 B2 | 2/2018 | Zulim et al. | |
| 10,068,464 B2 | 9/2018 | Devlin | |
| 10,085,331 B2 * | 9/2018 | Alexander | H05B 47/195 |
| 10,235,516 B2 | 3/2019 | Parello et al. | |
| 10,306,733 B2 | 5/2019 | Chemel et al. | |
| 10,334,682 B1 | 6/2019 | Hsu et al. | |
| 10,334,699 B2 | 6/2019 | Lydecker et al. | |
| 10,405,404 B1 | 9/2019 | Trickler et al. | |
| 10,638,570 B2 | 4/2020 | Charlton | |
| 10,750,601 B1 | 8/2020 | Westrick, Jr. et al. | |
| 2012/0049749 A1 | 3/2012 | Pearlman et al. | |
| 2012/0091915 A1 * | 4/2012 | Ilyes | H05B 47/185 315/307 |
| 2012/0112654 A1 * | 5/2012 | Choong | H05B 47/18 315/291 |
| 2014/0265880 A1 | 9/2014 | Taipale et al. | |
| 2015/0130359 A1 * | 5/2015 | Bosua | H05B 47/175 315/160 |
| 2019/0313503 A1 | 10/2019 | Woytowitz | |

OTHER PUBLICATIONS

U.S. Appl. No. 16/589,545, "Non-Final Office Action", dated Dec. 23, 2019, 12 pages.

U.S. Appl. No. 16/589,545, "Notice of Allowance", dated Apr. 9, 2020, 10 pages.

U.S. Appl. No. 16/589,545, "U.S. Patent Application No.", Lighting Fixture Commissioning Based on Powerline Signaling Techniques, Oct. 1, 2019.

* cited by examiner

LIGHTING FIXTURE COMMISSIONING BASED ON POWERLINE SIGNALING TECHNIQUES

RELATED APPLICATIONS

The present application claims priority to U.S. application Ser. No. 16/589,545 for "Lighting Fixture Commissioning Based on Powerline Signaling Techniques" filed Oct. 1, 2019, which is incorporated by reference herein in its entirety.

TECHNICAL FIELD

This disclosure relates generally to the field of lighting fixtures, and more specifically relates to commissioning of programmable lighting fixtures.

BACKGROUND

An intelligent lighting fixture may provide controllable lighting effects in an environment. For example, the intelligent lighting fixture may provide lighting effects such as dimming, color selection, correlated color temperature selection, timed lighting, multiple scenes, or other suitable lighting effects. In some cases, an intelligent lighting fixture is commissioned, such as by logically pairing the intelligent lighting fixture with an intelligent lighting controller. In some cases, the intelligent lighting fixture may require commissioning to perform one or more of the controllable lighting effects.

Commissioning an intelligent lighting fixture may include transmitting one or more communications between the intelligent lighting fixture and an intelligent lighting controller. In some cases, the commissioning communications identify which intelligent lighting fixtures are controlled by a particular intelligent lighting controller. Existing commissioning techniques may be initiated by depressing a button on the lighting device that is being commissioned. However, this technique may cause difficulties for a person who is performing the commissioning. For example, a lighting technician may need to move a ladder to each lighting fixture that is being commissioned, and to climb up and down the ladder multiple times in order to depress the button. In addition, existing commissioning techniques may require additional components, such as low-voltage wiring or power line communication ("PLC") transceivers, and the size, complexity, or installation of these components may increase the cost of these existing commissioning techniques.

Another existing commissioning technique may include transmitting a communication via radio frequency ("RF") signals. However, a lighting fixture that is in close proximity to an RF controller may be difficult to assign to a different controller, if the user wishes to assign the fixture to a different group or zone. In addition, an RF signal may be vulnerable to interference, in particular during the initial commissioning of an intelligent lighting fixture. The RF signal may be subject to accidental or malicious interference, resulting in the commissioning being error-prone or vulnerable to an attack by a malicious actor.

It is desirable to develop commissioning techniques that are simple for a person to perform, without requiring movement between lighting fixtures, and without requiring physical contact with or visible feedback from the lighting fixtures being commissioned. It is also desirable to develop commissioning techniques that do not require installation of additional wires or other components. It is also desirable to develop commissioning techniques that are resilient against interference.

SUMMARY

According to certain implementations, an intelligent lighting controller and an intelligent lighting fixture are connected via high-voltage electrical wiring. The electrical wiring may be configured for transmitting AC power signals. The intelligent lighting controller modifies a waveform of the AC power signal. The modification may include omitting a sequence of portions of the waveform, such that the sequence of omitted portions indicates a commissioning signal. The intelligent lighting fixture may receive the modified AC power signal via the electrical wiring. In addition, the intelligent lighting fixture may enter a commissioning mode responsive to determining that the omitted sequence of waveform portions indicates the commissioning signal. In some cases, the intelligent lighting controller modifies an additional portion of the AC power signal by omitting an additional sequence of portions of the waveform, such that the additional omitted sequence indicates a commissioned group. The intelligent lighting fixture may join the commissioned group responsive to determining that the additional omitted sequence of waveform portions indicates the commissioned group.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
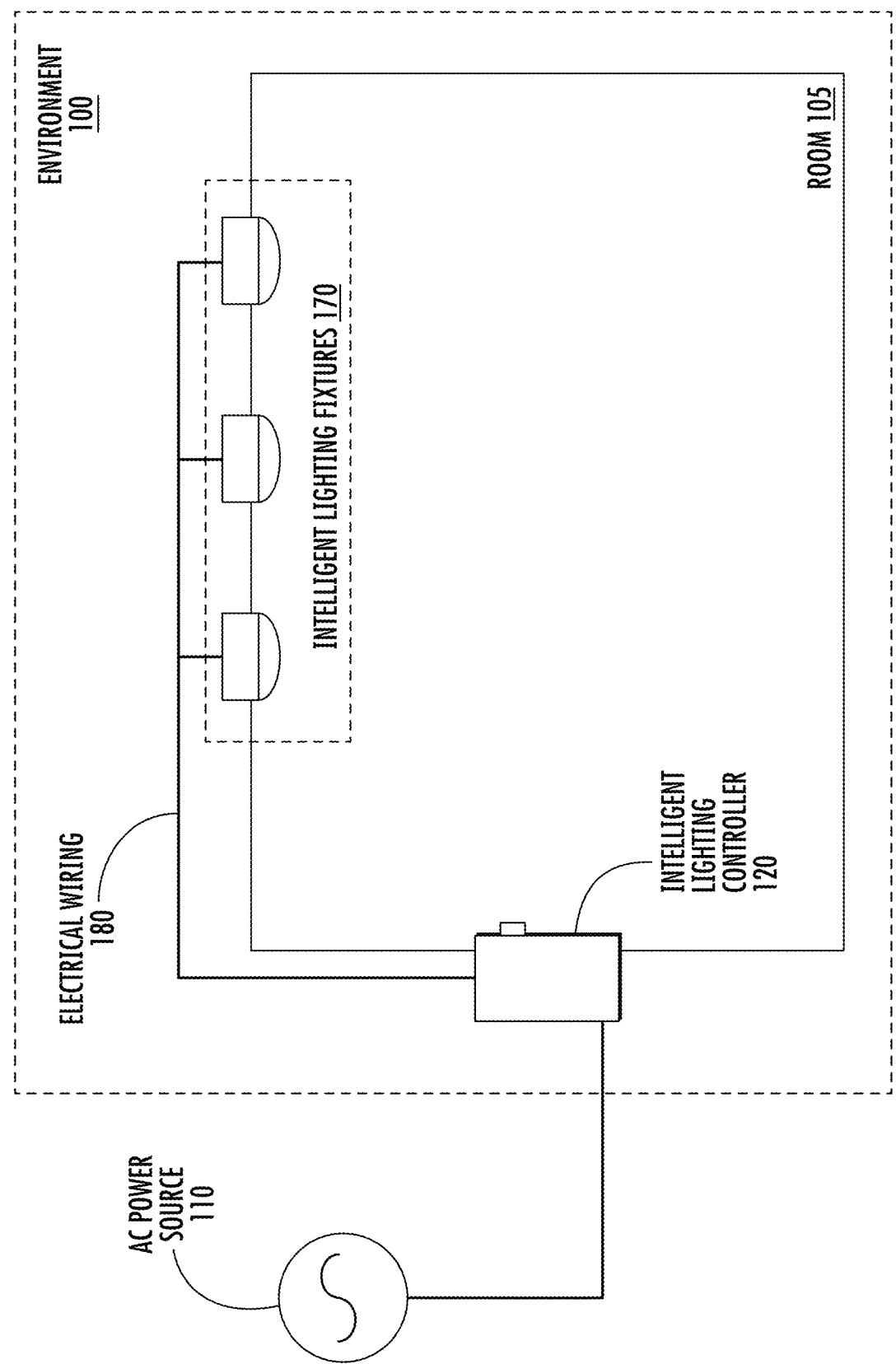
FIG. 1 is a block diagram depicting an example of an environment in which an intelligent lighting system is commissioned via powerline commissioning techniques, according to certain implementations.

As discussed above, prior commissioning techniques for intelligent lighting fixtures do not provide a commissioning process that is both secure and physically simple to perform.

Certain implementations described herein provide for powerline commissioning techniques that may be initiated by a technician at an intelligent lighting controller, without requiring physical access to each intelligent lighting fixture. These techniques may improve speed and efficiency for performing the commissioning, as well as improving comfort for the technician, such as by eliminating or reducing a need to climb ladders, shift ceiling panels, or other physical steps to access or visually check each intelligent lighting fixture.

In addition, the described powerline commissioning techniques may improve security for the commissioning process, such as by reducing or eliminating wireless signals that are transmitted to or from an uncommissioned intelligent lighting fixture. Security of an intelligent lighting system may be improved by eliminating wireless transmissions from an uncommissioned lighting fixture that is advertising its presence or availability to join an intelligent lighting system. For example, initiating commissioning via a powerline signaling technique may eliminate a scanning process of uncommissioned intelligent lighting fixtures, such as scanning for lighting fixtures via wireless transmissions. The described techniques may reduce errors resulting from a lighting fixture responding to an inappropriate wireless commissioning signal (e.g., transmitted from a different floor of a building). In addition, the described techniques may reduce opportunity for deliberate interference from an outside system, such as malicious interference from a party seeking to gain access to the intelligent lighting system.

The following examples are provided to introduce certain implementations of the present disclosure. An intelligent lighting system may be installed in an area, such as a room that is being retrofitted with the intelligent lighting system. In installation area, an intelligent lighting controller and an intelligent lighting fixture may be connected via high-voltage electrical wiring that is configured for transmitting AC power signals. The electrical wiring may connect multiple intelligent lighting fixtures in the installation area, such as via a lighting circuit in the room that is being retrofitted. A commissioning process may be initiated at the intelligent lighting controller, such as in response to an input (e.g., by a technician using the intelligent lighting controller). The intelligent lighting controller modifies the AC power signal by omitting a sequence of portions of a waveform of the AC power signal. The sequence of omitted portions may indicate a commissioning signal. The intelligent lighting fixture may receive the modified AC power signal via the electrical wiring. In addition, the intelligent lighting fixture may enter a commissioning mode responsive to determining that the omitted sequence of waveform portions indicates the commissioning signal. Subsequent to providing the modified AC power signal, the intelligent lighting controller modifies an additional portion of the AC power signal by omitting an additional sequence of portions of the waveform, such that the additional omitted sequence indicates a commissioned group. The intelligent lighting fixture may join the commissioned group responsive to receiving the additional omitted sequence of waveform portions. In some cases, responsive to receiving the commissioning signal via the electrical wiring, the intelligent lighting fixture transmits a verification signal via a wireless technique, such as to verify information in the commissioning signal.

Referring now to the drawings, FIG. 1 is a diagram depicting an example of an environment 100 in which an intelligent lighting system may be commissioned via powerline commissioning techniques. In the environment 100, one or more intelligent lighting fixtures, such as a plurality of intelligent lighting fixtures 170, and at least one intelligent lighting controller, such as the intelligent lighting controller 120, are installed in an area of the environment 100. In FIG. 1, the installation area is depicted as a room 105, but other implementations are possible. For example, the installation area may include an interior area of a building (e.g., rooms, hallways, maintenance areas), an exterior area (e.g., entryways, accent lighting), areas that are not associated with a building (e.g., parking lots, gardens), or any other suitable area (or combination of areas) in which an intelligent lighting system may be installed.

Each of the intelligent lighting fixtures 170 may be capable of providing programmable lighting effects. Examples of programmable lighting effects include (without limitation) dimming, color selection, correlated color selection, timed lighting, multiple scenes, or other suitable programmable lighting effects. In some cases, programmable lighting effects include effects that are provided based on input from one or more sensors, (e.g., occupancy sensors, ambient light sensors, temperature sensors). In addition, the intelligent lighting controller 120 may be capable of providing instructions to one or more of the intelligent lighting fixtures 170. For example, the lighting controller 120 may provide to the lighting fixtures 170 digital instructions to provide a programmable lighting effect. In some cases, the intelligent lighting controller 120 is configured to receive instructions describing the one or more programmable lighting effects. For example, the lighting controller 120 may receive instructions from a component in an intelligent lighting system (e.g., a central control panel, a security system). In some cases, the lighting controller 120 may transmit some or all of the received instructions to the intelligent lighting fixtures 170.

In some cases, the environment 100 may have electrical wiring, such as electrical wiring 180. The electrical wiring 180 may provide an electrical pathway between the intelligent lighting controller 120 and the intelligent lighting fixtures 170. In some cases, the electrical wiring 180 is a conductor for an alternating current ("AC") power signal. For example, an AC power source 110 may provide the AC power signal to the lighting controller 120. The electrical wiring 180 may conduct the AC power signal between the lighting controller 120 and each of the lighting fixtures 170. In some cases, the AC power signal may be considered a high-voltage power signal having a voltage that is suitable for powering a residential or business facility (e.g., 120 V, 240 V, 277V).

In some implementations, the environment 100 is a retrofit environment, such as an installation area in which light fixtures and light switches are replaced with an intelligent lighting system. For example, one or more of the intelligent lighting fixtures 170 may replace a previous lighting fixture that is incapable of providing a programmable lighting effect. In addition, the intelligent lighting controller 120 may replace a previous lighting switch that is incapable of providing digital instructions to a lighting fixture. In the example retrofit environment, the electrical wiring 180 may include legacy wiring, such as wiring present in the walls of the room 105 prior to replacement of a lighting fixture or lighting switch. The electrical wiring 180 may connect each lighting fixture on a lighting circuit in the room 105, such as a legacy lighting circuit that connects previous lighting fixtures (e.g., replaced by the intelligent lighting fixtures 170) to a previous light switch (e.g., replaced by the intelligent lighting controller 120).

In some implementations, a commissioning process may be performed for the intelligent lighting fixtures 170. The commissioning process may include transmission of one or more commissioning signals to the intelligent lighting fixtures 170 from the intelligent lighting controller 120. The commissioning signals may indicate an association between the intelligent lighting fixtures 170 and the intelligent lighting controller 120, such as an association that assigns the intelligent lighting fixtures 170 to a group that is controlled by digital instructions received from the intelligent lighting controller 120. Responsive to receiving the commissioning signals, each of the lighting fixtures in the intelligent lighting fixtures 170 may perform one or more operations related to joining the commissioned group for the intelligent lighting controller 120. Subsequent to joining the commissioned group, the intelligent lighting fixtures 170 may provide programmable lighting effects based on digital instructions received from the intelligent lighting controller 120.

As used herein, the term "group" refers to one or more intelligent lighting fixtures that are configured to provide programmable lighting effects based on digital instructions received from a particular intelligent lighting controller that is associated with the group of fixtures. Commissioned groups of intelligent lighting fixtures may provide an understandable way (e.g., readily understood by a technician or user of the lighting system) to distribute digital instructions to collections of fixtures. For example, an intelligent lighting fixture within a group may respond to group instructions (e.g., an instruction indicating "power on" for all group fixtures). In addition, an intelligent lighting fixture within a group may be assigned to one or more zones (e.g., subgroups), and may respond to zone instructions (e.g., an instruction indicating "dim to 50%" for all fixtures in a zone). In some cases, a particular intelligent lighting fixture that is included in a commissioned group may disregard instructions received from another intelligent lighting controller that is unassociated with the particular fixture's group. For example, if the particular lighting fixture that is capable of receiving instructions that are broadcast to multiple groups (e.g., wirelessly broadcast, wired broadcast), the particular lighting fixture may disregard the broadcast instructions responsive to determining that the broadcast instructions are not associated with the particular fixture's group.

In the environment 100, one or more commissioning signals for the intelligent lighting fixtures 170 may be transmitted via the electrical wiring 180. For example, the intelligent lighting controller 120 may modify an AC power signal received from the AC power source 110. The modification may include omitting a portion, or multiple portions, of the waveform of the AC power signal. In some cases, the omitted portions may represent a commissioning signal. The intelligent lighting controller 120 may transmit the modified waveform to each of the intelligent lighting fixtures 170 that are configured to receive power via the wiring 180. Responsive to receiving the modified power signal, each of the intelligent lighting fixtures 170 may perform one or more operations related to commissioning, such as entering a commissioning mode or joining a commissioned group. The commissioning signal may be received by each lighting fixture that is connected via electrical wiring 180, such as each lighting fixture connected via the legacy lighting circuit in the room 105.

In some cases, a commissioning process in the environment 100 may include multiple modifications to a power signal. For example, the intelligent lighting controller 120 may perform a first modification of the AC power signal. The first modification may include omitting a first portion, or sequence of portions, of the AC power signal. Each of the intelligent lighting fixtures 170 may receive the AC power signal with the first modification via the electrical wiring 180. Responsive to determining that the AC power signal has the first modification, the intelligent lighting fixtures 170 may perform one or more operations related to commissioning. For example, one or more of the intelligent lighting fixtures 170 may enter a commissioning mode, in which a respective intelligent lighting fixture is configured to modify its respective commissioned group. In some cases, an intelligent lighting fixture that has entered commissioning mode may perform one or more additional operations related to entering the mode, such as emitting light at a predetermined level (e.g., terminating a programmed dimming or color lighting effect), providing a visual indication of the mode (e.g., flashing a light emitter, illuminating an indicator LED), or other suitable operations related to entering a commissioning mode.

In addition, the intelligent lighting controller 120 may perform a second modification of the AC power signal. The second modification may include omitting a second portion, or sequence of portions, of the AC power signal. The first and second modification may, but need not, have a similar pattern of omitted waveform portions. Each of the intelligent lighting fixtures 170 may receive the AC power signal with the second modification via the electrical wiring 180. Responsive to determining that the AC power signal has the second modification, the intelligent lighting fixtures 170 may perform one or more additional operations related to commissioning. For example, each of the intelligent lighting fixtures 170 may identify, based on the second modification, a commissioned group that is associated with the intelligent lighting controller 120. In addition, one or more of the intelligent lighting fixtures 170 may modify its respective commissioned group, such as by joining the identified commissioned group associated with the intelligent lighting controller 120. In some cases, an intelligent lighting fixture that has identified the commissioned group may perform one or more additional operations related to modifying a commissioned group, such as performing a security check or other verification of the modification. In some cases, the verification may include one or more signals that are not transmitted via the electrical wiring 180, such as a wireless verification transmission that is provided to or received from the intelligent lighting controller 120.

In some implementations, commissioning signals transmitted via the electrical wiring 180 indicate a Level 1 commissioning, which assigns the intelligent lighting fixtures 170 to a group that is controlled by the intelligent lighting controller 120. In some cases, additional commissioning signals (or other control signals) that indicate a Level 2 commissioning, such as an effect configuration signal, are provided to the intelligent lighting fixtures 170. The Level 2 commissioning may configure behaviors or actions performed by the intelligent lighting fixtures 170, such as assignment to a particular zone (e.g., window lighting, desk lighting) or producing a particular lighting effect (e.g., dimming, nighttime mode). The Level 2 commissioning may indicate programmable lighting effects that are configured to be implemented based on input from one or more sensors, such as an effect configuration signal that indicates a lighting effect provided in response to an input from an occupancy sensor. In some implementations, the Level 2 commissioning may indicate a modification of a Level 1 commissioning. For example, the intelligent lighting controller 120 may send, to the lighting fixtures 170, a modified AC power signal that includes a Level 1 commissioning signal assigning the lighting fixtures 170 to a group associated with the controller 120. In addition, the intelligent lighting controller 120 may send, to a particular one of the lighting fixtures 170, a Level 2 commissioning signal that assigns the particular lighting fixture to an additional group. In some cases, the additional group does not include the controller 120. Subsequent to being assigned to the additional group, the particular lighting fixture may provide programmable lighting effects based on digital instructions received from an additional intelligent lighting controller in the additional group. In some cases, the particular lighting fixture may disregard instructions received from the intelligent lighting controller 120, such as if the additional group does not include the controller 120.

In some implementations, the Level 1 commissioning is indicated via one or more modifications to an AC power signal, such as the modified power signal transmitted via the electrical wiring 180. In addition, the Level 2 commissioning is indicated via one or more signals transmitted via an additional transmission channel that does not include the electrical wiring 180, such as a wireless transmission channel or low-voltage wiring. For example, the intelligent lighting controller 120 may send to the lighting fixtures 170 a modified AC power signal via the electrical wiring 180. The modified AC power signal may indicate a Level 1 commissioning signal, such that the lighting fixtures 170 enter a commissioning mode responsive to the modified AC power signal. Subsequently, the intelligent lighting controller 120 may send to the lighting fixtures 170 an effect configuration signal via an additional communication channel that excludes the electrical wiring 180. For example, the effect configuration signal may be sent wirelessly, such as via one or more antennas of the controller 120 or the fixtures 170, or via an additional wired channel, such as low-voltage wiring. The effect configuration signal may indicate a Level 2 commissioning signal, such that, based on digital instructions included in the effect configuration signal, the lighting fixtures 170 are configured to provide one or more programmable lighting effects.

In some implementations, security data may be transmitted via a modification of the AC power signal. For example, the intelligent lighting controller 120 may perform an additional modification of the AC power signal (such as, but not limited to, a modification indicating a verification check or a Level 2 commissioning). The additional modification may omit an additional portion, or sequence of portions, of the AC power signal. In addition, the additional modification may indicate security data, such as security data that is associated with the intelligent lighting controller 120, the group controlled by the controller 120, or both. In some cases, the security data may include one or more of information describing a secured communications network (e.g., an address, a login/password), a cryptographic key or key pair, or other information that is usable to secure communications between components in an intelligent lighting network. Each of the intelligent lighting fixtures 170 may receive the AC power signal with the additional modification via the electrical wiring 180. Responsive to determining that the AC power signal has the additional modification, the intelligent lighting fixtures 170 may transmit a communication that is secured using the indicated security data. For example, each of the intelligent lighting fixtures 170 may transmit, to the intelligent lighting controller 120, a secured communication, such as a secured communication that is encrypted using a cryptographic key indicated by the additional modification. In some cases, the secured communication is transmitted via an additional communication channel that excludes the electrical wiring 180. For example, the secured communication may be sent wirelessly, such as via one or more antennas of the controller 120 or the fixtures 170, or via an additional wired channel, such as low-voltage wiring.

Figure 2:
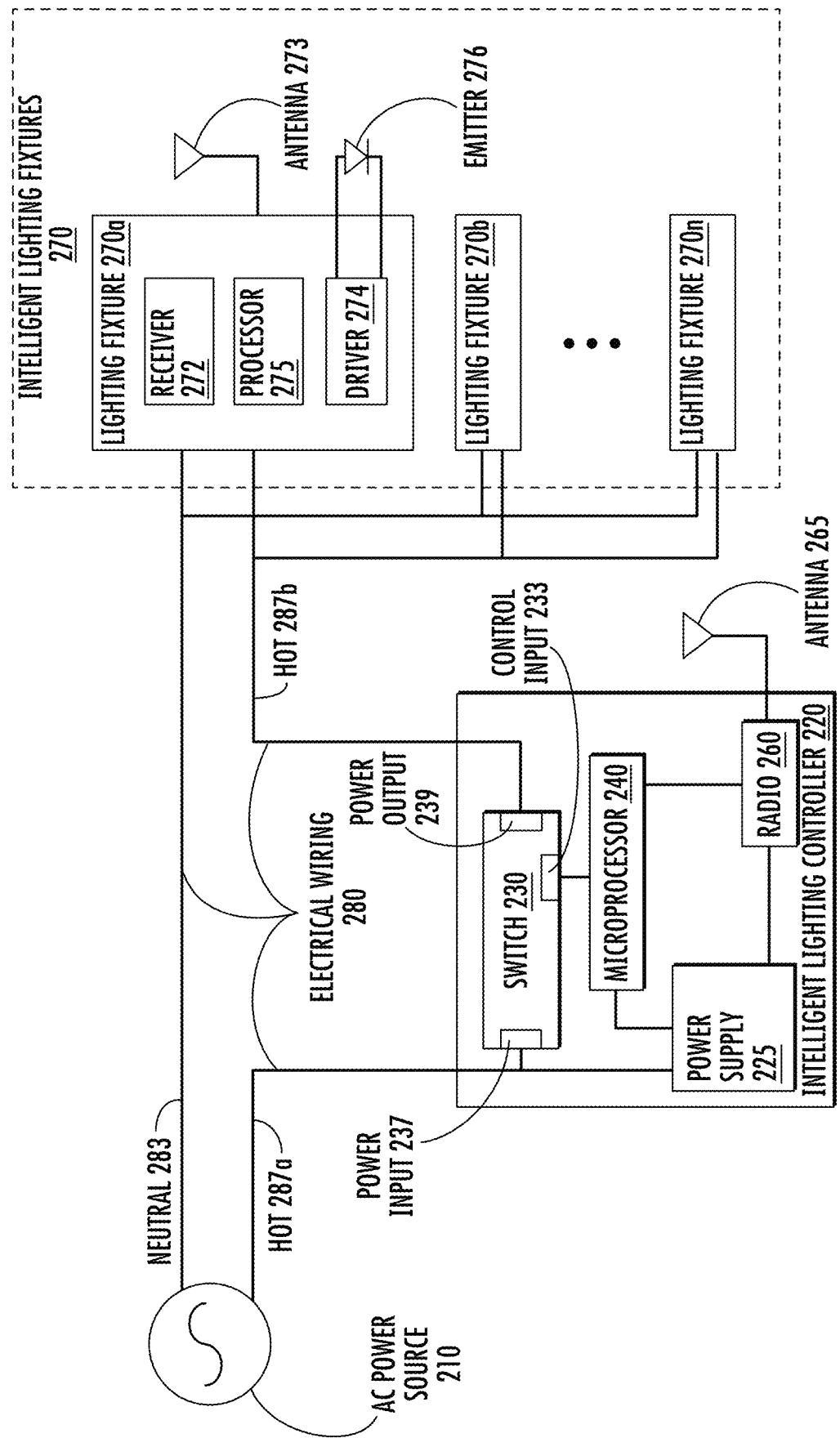
FIG. 2 is a diagram depicting an example of an intelligent lighting controller configured to commission a plurality of intelligent lighting fixtures via powerline commissioning techniques, according to certain implementations.

FIG. 2 is a diagram depicting an example implementation of an intelligent lighting controller 220 and a plurality of intelligent lighting fixtures 270 connected via electrical wiring 280. The intelligent lighting fixtures 270 may include multiple fixtures, such as an intelligent lighting fixture 270a, an intelligent lighting fixture 270b, through an intelligent lighting fixture 270n. The intelligent lighting controller 220, the intelligent lighting fixtures 270, and the electrical wiring 280 may be included in a retrofit environment or other installation area, such as the environment 100. In some cases, the electrical wiring 280 is legacy wiring.

The electrical wiring 280 may be configured to transmit high-voltage electrical power, such as an AC power signal received from an AC power source 210. The electrical wiring 280 may include a neutral line 283 that provides an electrical pathway between the AC power source 210 and the intelligent lighting fixtures 270. In some implementations, the neutral line 283 may be connected to the intelligent lighting controller 220, such that the neutral line 283 provides an electrical pathway between the AC power source 210 and the controller 220, and between the controller 220 and the intelligent lighting fixtures 270.

In addition, the electrical wiring 280 may include a hot line 287a that provides an electrical pathway between the AC power source 210 and the intelligent lighting controller 220, and a hot line 287b that provides an electrical pathway between the intelligent lighting controller 220 and the intelligent lighting fixtures 270. The hot lines 287a and 287b are collectively referred to herein as hot line 287. In some cases, the electrical wiring 280 may include an additional line that is designated as a ground line.

In FIG. 2, the intelligent lighting controller 220 is configured to carry power that is transmitted on the hot line 287. In some cases, the intelligent lighting controller 220 includes a switch 230 that is configured to allow or prevent transmission of the AC power signal transmitted on the hot line 287. The switch 230 may include a transistor (e.g., MOSFET, BJT, IGBT, SiCFET), a relay, a thyristor, or other electrical component (or combination of components) suitable to allow and prevent transmission of a high-voltage AC power signal. In addition, the intelligent lighting controller 220 may include one or more of a microprocessor 240, a radio 260, an antenna 265, and a power supply 225. In some cases, the intelligent lighting controller 220 may include one or more user interface components, such as a button, a touchscreen, a toggle, a slider, or any other suitable user interface component (or combination of components). In addition, the intelligent lighting controller 220 may include (or be configured to connect to) one or more sensors, such as an occupancy sensor, an ambient light sensor, or other suitable sensor types.

In some implementations, the switch 230 may modify the AC power signal that is received on the hot line 287a, such as via a power input 237. In addition, the switch 230 may transmit the modified power signal on the hot line 287b, such as via a power output 239. In some cases, the modification to the power signal is based on an indication received from the microprocessor 240, such as a digital instruction signal indicating the modification. The indication may be received by the switch 230 via a control input 233. In some cases, the digital instruction includes a commissioning signal, such as an instruction for an intelligent lighting fixture to enter a commissioning mode. The microprocessor 240 may provide the digital instruction responsive to an input to the intelligent lighting controller 220, such as an input received via the radio 260, or via a user interface component of the intelligent lighting controller 220, or via another suitable input technique. In some cases, the digital instruction indicates the modification for the power signal, such as a digital instruction having bits representing portions of the power signal that are to be omitted. Based on the digital instruction or other indication from the microprocessor 240, the switch 230 modifies one or more portions of the waveform for the AC power signal received via the hot line 287*a*. In some cases, the modified waveform includes a sequence of omitted waveform portions. In addition, the omitted sequence may indicate the commissioning signal. The modified waveform may be transmitted to the intelligent lighting fixtures 270 via the hot line 287*b*.

In some cases, each of the intelligent lighting fixtures 270 determines that the AC power signal received via the line 287*b* includes a modification. For example, a receiver 272 included in the lighting fixture 270*a* monitors the AC power signal present on the line 287*b*. Based on the monitoring, the receiver 272 may detect that the AC power signal is modified to include the sequence of omitted waveform portions. In addition, the receiver 272 may provide an indication of the omitted sequence, such as to a microprocessor 275. The processor 275 may determine that the sequence indicates the commissioning signal. Responsive to determining that the modified AC power signal indicates the commissioning signal, the processor 275 performs an operation related to commissioning, such as entering a commissioning mode. While operating in the commissioning mode, the processor 275 may perform one or more additional operations, such as providing a command to a lighting driver 274, which may adjust a power current supplied to a lighting emitter 276. Each of the fixtures 270*a* through 270*n* may receive the modified power signal via the line 287*b*. In addition, each of the fixtures 270*a* through 270*n* may respond to the commissioning signal, such as by entering commissioning mode.

In some implementations, the switch 230 may apply additional modifications to additional portions of the AC power signal received on the line 287*a*. For example, subsequent to modifying the AC power signal to indicate the commissioning signal, the switch 230 may receive from the microprocessor 240 an additional digital instruction (or other indication) that indicates an additional commissioning signal. For example, the additional commissioning signal may indicate one or more of an identification of the intelligent lighting controller 220, an identification of a commissioned group associated with the intelligent lighting controller 220, or other information related to commissioning. Based on the additional digital instruction, the switch 230 modifies one or more portions of the AC waveform received via the line 287*a*, such as by omitting an additional sequence of waveform portions to indicate the additional commissioning signal The additional modified waveform may be transmitted to the intelligent lighting fixtures 270 via the line 287*b*.

The receiver 272 may detect the additional modified waveform of the AC power signal. In addition, the receiver may provide an indication of the additional omitted sequence, such as to the processor 275. Responsive to receiving the indication of the additional omitted sequence, the processor 275 determines that the additional sequence indicates the additional commissioning signal. In addition, responsive to determining that the additional commissioning signal identifies the commissioned group of the intelligent lighting controller 220, the processor 275 performs one or more additional operation related to commissioning, such as modifying the commissioned group assigned to the fixture 270*a*. Each of the fixtures 270*a* through 270*n* may receive the additional modification of the power signal via the line 278*b*. In addition, each of the fixtures 270*a* through 270*n* may respond to the additional commissioning signal, such as by each modifying the respective commissioned group of the respective fixture.

In some implementations, one or more of the intelligent lighting fixtures 270 performs additional operations related to modifying a respective commissioned group, such as verification operations. The verification operations may include transmission of one or more signals via an additional transmission channel that does not include the electrical wiring 280. For example, responsive to determining that the power signal on line 287*b* is modified to indicate the commissioning signal or the additional commissioning signal, the lighting fixture 270*a* may transmit a verification signal via an antenna 273. Although FIG. 2 depicts the fixture 270*a* as having an antenna 273, other implementations are possible, such as transmission of a verification signal via low-voltage wiring that is separate from the electrical wiring 280. The verification signal may indicate that a commissioning signal has been received by the fixture 270. In addition, the verification signal may indicate the commissioned group identified by the commissioning signal. In some cases, the verification signal may be transmitted to the intelligent lighting controller 220. For example, the intelligent lighting controller 220 may receive the verification signal via the antenna 265. In addition, the verification signal may be transmitted to an additional component in an intelligent lighting system, such as a central control panel or an additional intelligent lighting controller. The lighting fixture 270*a* may receive a verification response via the antenna 273, such as a verification response transmitted by the intelligent lighting controller 220 via the antenna 265. In some cases, the lighting fixture 270*a* may modify its commissioned group responsive to receiving the verification response (e.g., subsequent to a confirmation of the commissioning signal or the commissioned group).

In some implementations, a modified AC power signal may include a sequence of omitted portions of the power signal waveform. The sequence of omitted waveform portions may indicate, for example, a digital instruction received by a switch in an intelligent lighting controller, such as the switch 230. In some cases, the sequence of omitted waveform portions may include a pattern that indicates a commissioning signal. In addition, the sequence of omitted waveform portions may include a first pattern indicating a first bit and a second pattern indicating a second bit, such that the commissioning signal is indicated by a series of the first and second patterns. Additional patterns may be used, such as respective patterns indicating a high bit, a low bit, a start bit, or an end bit.

Figure 3:
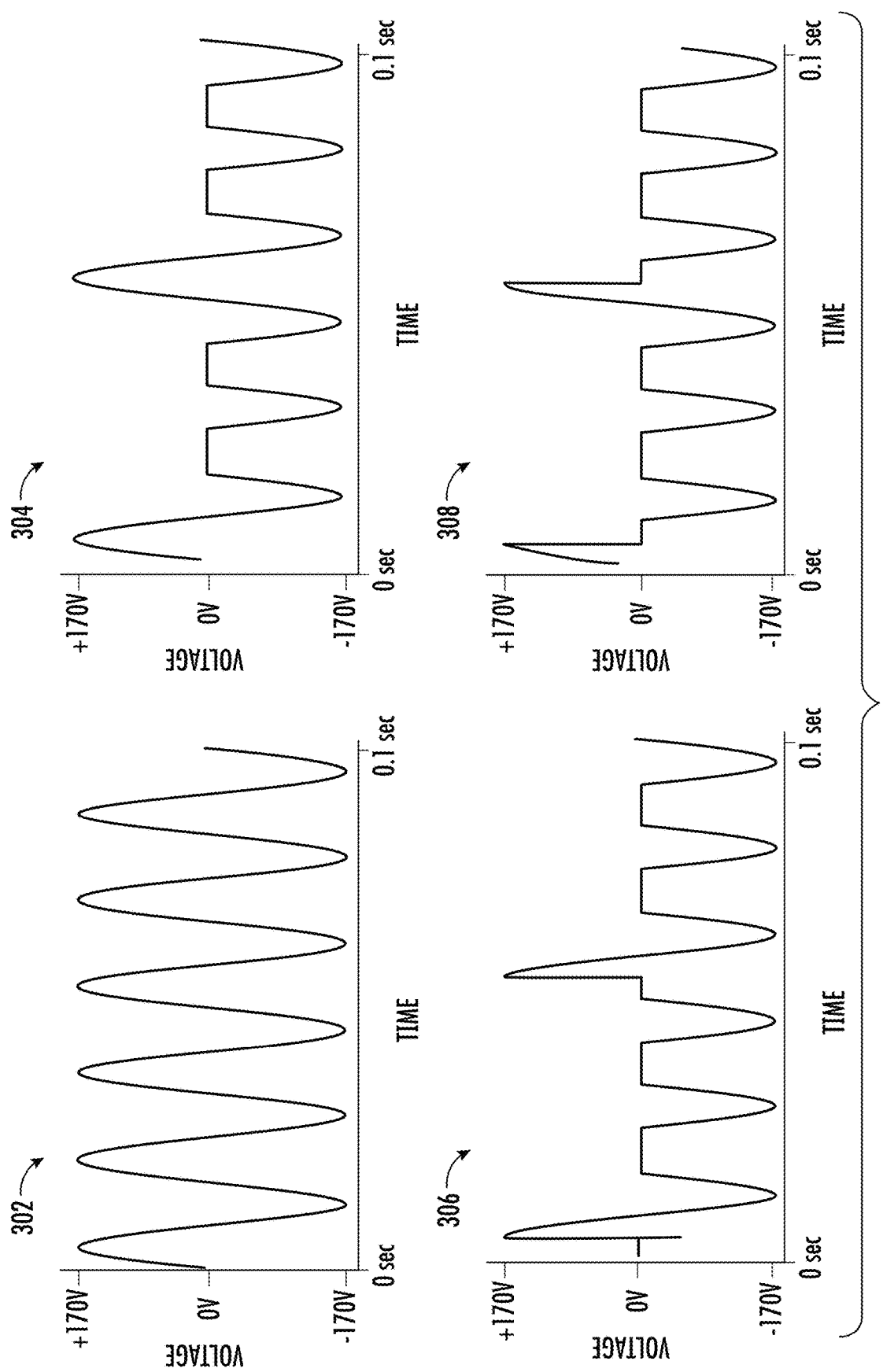
FIG. 3 is a diagram depicting examples of a sequence of omitted waveform portions, according to certain implementations.

FIG. 3 is a diagram depicting examples of a sequence of omitted waveform portions. The examples in FIG. 3 are non-limiting, and other sequences of omissions may be used without departing from the implementations and techniques described herein. The depicted waveforms 302, 304, 306, and 308 include example portions from an AC power signal having a root-mean-squared ("RMS") voltage of approximately 120 V, a peak voltage of approximately 170 V, and a frequency of approximately 60 Hz, but other implementations are possible, including other peak-to-peak voltages and other frequencies. The waveform 302 depicts an unmodified portion of the example AC power signal. The unmodified portion includes six complete (e.g., non-omitted) cycles having an amplitude from about −170 V to about +170 V, over a time duration from about t=0 sec to about t=0.1 sec.

The waveform 304 depicts an example of a sequence of omitted waveform portions. The waveform 304 includes a complete cycle having an amplitude from about −170 V to about +170 V, followed by two cycles having omitted positive portions (e.g., omitted from about 0 to 170 V) and non-omitted negative portions (e.g., non-omitted from about −170 to 0 V). The example sequence of a complete cycle followed by two cycles having omitted positive portions is repeated once in the waveform 304.

The waveform 306 depicts an additional example of a sequence of omitted waveform portions. The waveform 306 includes a cycle having an omitted initial positive half, followed by two cycles having omitted positive portions and non-omitted negative portions. The example sequence of a cycle having an omitted initial positive half followed by two cycles having omitted positive portions is repeated once in the waveform 306.

The waveform 308 depicts an additional example of a sequence of omitted waveform portions. The waveform 308 includes a cycle having an omitted latter positive half, followed by two cycles having omitted positive portions and non-omitted negative portions. The example sequence of a cycle having an omitted latter positive half followed by two cycles having omitted positive portions is repeated once in the waveform 308.

In some cases, the example sequences depicted in waveforms 304, 306, and 308 may be used as patterns indicating bits. For example, the example sequence in waveform 304 may indicate a start bit (e.g., a bit indicating a beginning of a sequence of bits). In addition, the example sequence in waveform 306 may indicate a high bit, and the example sequence in waveform 308 may indicate a low bit. In some implementations, a modification to an AC power signal may include one or more of the example sequences, such that a commissioning signal is indicated by the included example sequences (e.g., a series of bits). The examples depicted in FIG. 3 are non-limiting, and other omitted (or non-omitted) sequences may be used without departing from the implementations and techniques described herein, such as omissions of half waves, full waves, partial waves, portions of positive waves, portions of negative waves, or any other omission or combination of omissions on an AC power signal.

Figure 4:
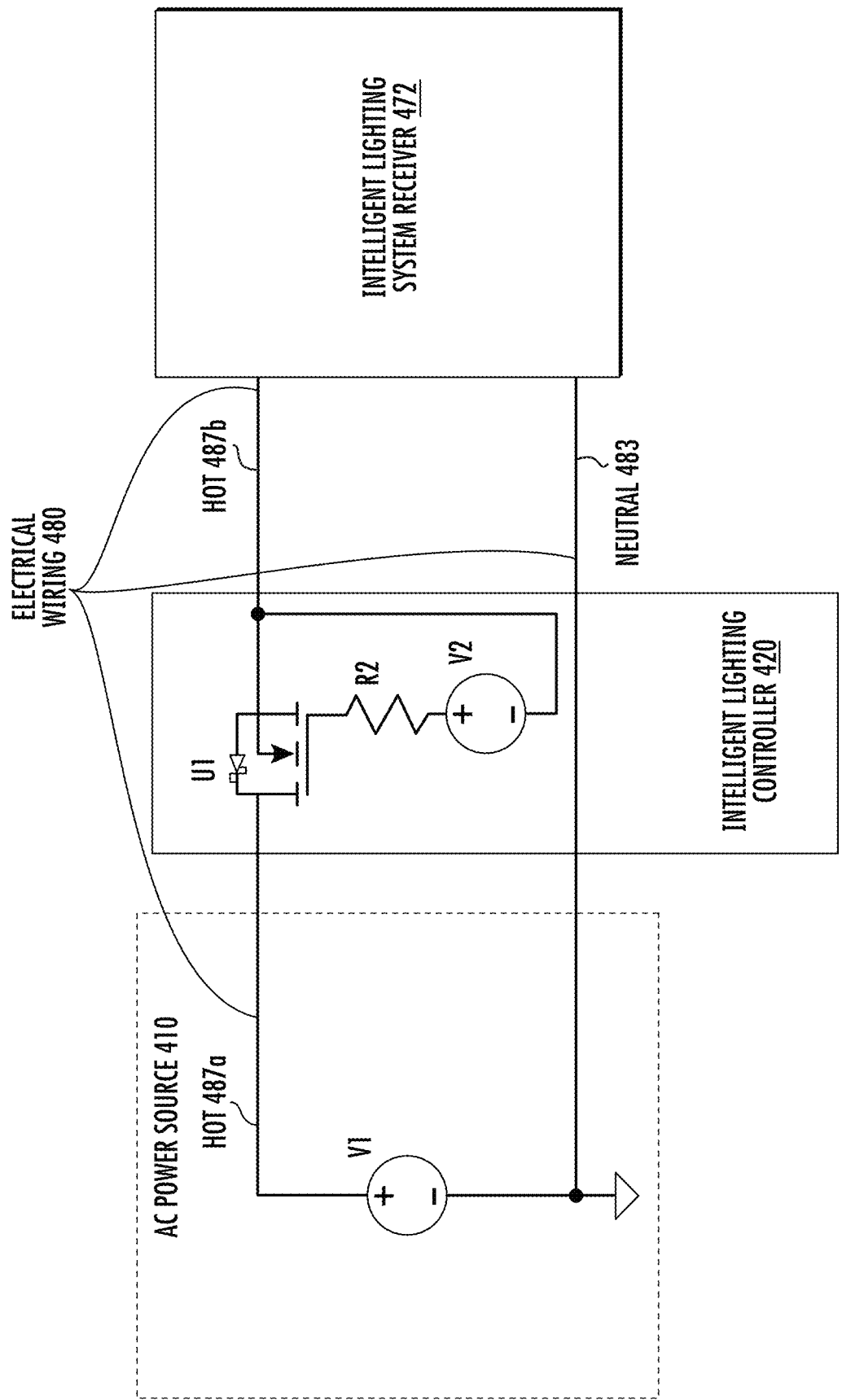
FIG. 4 is a diagram depicting an example configuration of electrical components that may be used to modify an AC power signal, according to certain implementations.

In some implementations, an intelligent lighting controller includes one or more electrical components that are configured to modify an AC power signal. In addition, an intelligent lighting fixture includes one or more electrical components that are configured to determine a modification of a received AC power signal. FIG. 4 is a diagram depicting an example configuration of electrical components that may be used to modify an AC power signal. In FIG. 4, an AC power source 410, an intelligent lighting controller 420, and an intelligent lighting system receiver 472 are connected via electrical wiring 480. The intelligent lighting controller 420, the receiver 472, and the electrical wiring 480 may be included in a retrofit environment or other installation area, such as described in regards to FIGS. 1 and 2. In some cases, the electrical wiring 480 is legacy wiring. The receiver 472 may be included in a component of an intelligent lighting system, such as an intelligent lighting fixture, an intelligent sensor, an intelligent lighting driver, or another intelligent lighting component.

The electrical wiring 480 may be configured to transmit high-voltage electrical power, such as an AC power signal received from the AC power source 410. The electrical wiring 480 may include a neutral line 483 that provides an electrical pathway between the AC power source 410, the intelligent lighting controller 420, and the receiver 472. In some implementations, the intelligent lighting controller 420 may omit a neutral line, such that the neutral line provides an electrical pathway between the AC power source 410 and the receiver 472. In FIG. 4, the electrical wiring 480 may include a hot line 487a that provides an electrical pathway between the AC power source 410 and the intelligent lighting controller 420, and a hot line 487b that provides an electrical pathway between the intelligent lighting controller 420 and the receiver 472. The hot lines 487a and 487b are collectively referred to herein as hot line 487. In some cases, the electrical wiring 480 may include an additional line that is designated as a ground line.

The AC power source 410 may include at least one voltage source, such as a voltage source V1, that is configured to provide an AC power signal via the hot and neutral lines 487 and 483. The AC power signal may be transmitted to a switch that is included in the intelligent lighting controller 420, such as a metal-oxide semiconductor field-effect transistor ("MOSFET," "FET") U1 that is configured to perform switching on the hot line 487. In some implementations, the switch included in the controller 410 may include a MOSFET, a bipolar-junction transistor ("BJT"), a relay, an insulated-gate bipolar transistor ("IGBT"), a silicon-controlled rectifier ("SCR"), a bidirectional triode thyristor ("TRIAC"), or any other component or combination of components that is suitable to perform switching of the AC power signal. In some cases, the FET U1 may have a different orientation (e.g., positions of source and drain may be reversed relative to lines 487a and 487b), such as if negative portions of an AC waveform are omitted.

The intelligent lighting controller 420 may also include a digital voltage source V2, which is configured to provide a low-voltage control signal to the FET U1. In some cases, the low-voltage control signal may be provided via a microprocessor, such as a microprocessor that includes (or is configured to provide) the digital voltage source V2. In the intelligent lighting controller 420, a resistor R2 may be connected between the digital voltage source V2 and the gate of the FET U1. In some cases, the resistor R2 may have a value of about 10Ω to about 220Ω.

Based on the low-voltage control signal received from the digital voltage source V2, the FET U1 may modify the AC power signal received on line 487a. For example, the FET U1 may provide or omit portions of the waveform for the AC power signal, based on whether the FET U1 is switched open or closed. In addition, the FET U1 may omit the waveform portions in a sequence corresponding to a commissioning signal, such as a sequence of omitted portions representing one or more bits.

The modified AC power signal may be received by the receiver 472 via line 487b. The receiver 472 may include one or more electrical components configured to monitor the power signal on line 487b for modifications. Responsive to determining that the AC power signal on line 487b is modified in a pattern indicating the commissioning signal, the receiver 472 may provide an indication of the modification. For example, the receiver 472 may provide an indication to an intelligent lighting system component that includes the receiver 472. In addition, responsive to the indication from the receiver 472, the intelligent lighting system component may perform an operation related to commissioning.

Figure 5:
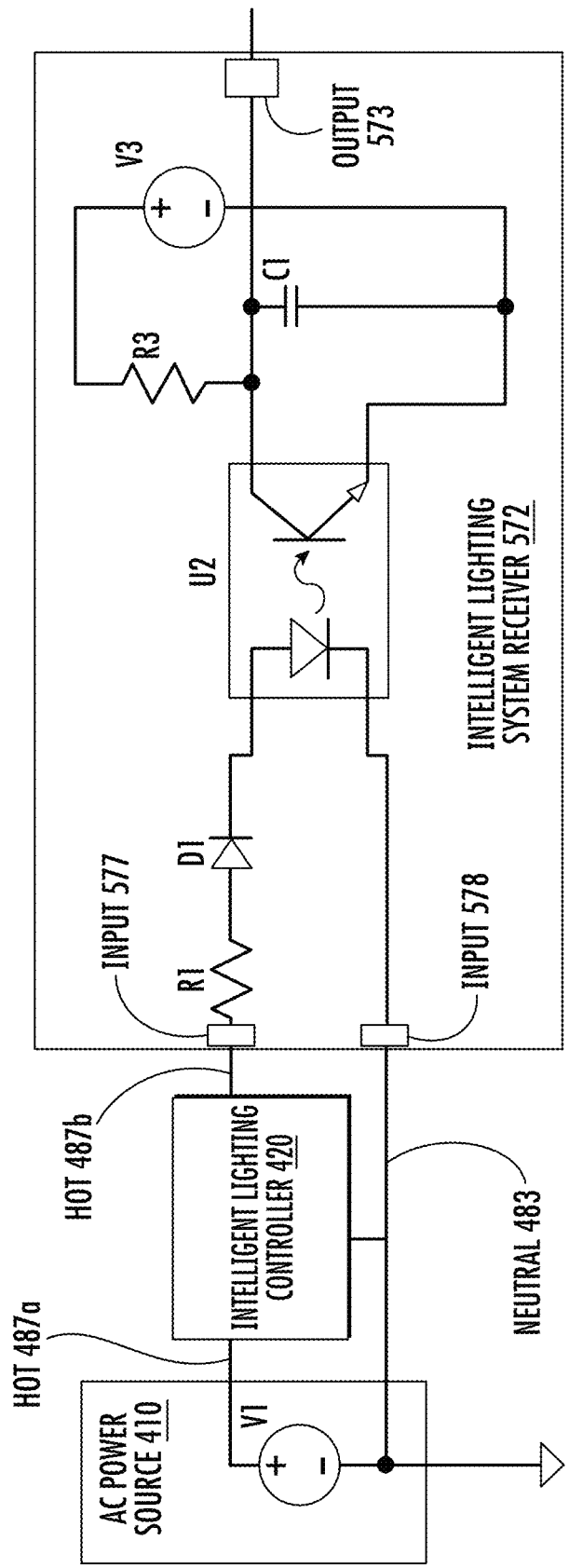
FIG. 5 is a diagram depicting an example configuration of electrical components that may be used to provide an output signal based on an amplitude of a received modified AC power signal, according to certain implementations.

In some implementations, multiple intelligent lighting system receivers may be configured to receive commissioning signals, via an AC power signal, from a particular intelligent lighting controller. FIG. 5 is a diagram depicting an example configuration of electrical components that may be used to receive a modified AC power signal. In FIG. 5 an intelligent lighting system receiver 572 is connected to the AC power source 410 and the intelligent lighting controller 420, such as described in regards to FIG. 4. In FIG. 5, the neutral line 483 may provide an electrical pathway between the AC power source 410, the intelligent lighting controller 420, and the receiver 572, and the hot line 487*b* may provide an electrical pathway between the intelligent lighting controller 420 and the receiver 572.

In some implementations, the receiver 572 may include an input 577 and an input 578 that are configured to receive an AC power signal. For example, the hot line 487*b* may be connected at the input 577 and the neutral line 483 may be connected at the input 578. In addition, the receiver 572 may include one or more sensors that are configured to monitor an amplitude of the received AC power signal, such as an optocoupler U2. In some cases, an input to the optocoupler U2 may be connected to one or more additional components, such as a resistor R1 in series connection with a diode D1. In some cases, the resistor R1 may have a value (e.g., about 220 kΩ) that is suitable to limit current received by the optocoupler U2. In addition, the diode D1 may provide current blocking at the input(s) of the optocoupler U2.

In some implementations, the optocoupler U2 may receive an AC power signal via one or more of the inputs 577 and 578. The received power signal may be a modified AC power signal, such as an AC signal modified by the FET U1 (e.g., as described in regards to FIG. 4), or the received power signal may be an unmodified AC power signal (e.g., not modified by the intelligent lighting controller 420). The optocoupler U2 may be configured to provide an output based on an amplitude of the received power signal. For example, the optocoupler U2 may provide an output when the received power signal has an amplitude above a forward voltage level (e.g., about 1.5 V) of a photodiode included in the optocoupler. In addition, the optocoupler U2 may withhold the output when the received power signal has an amplitude below the forward voltage level (e.g., the received AC signal is negative or around 0V). For example, based on the AC power signal received by the receiver 572, the optocoupler U2 may provide the output when the AC power signal has an amplitude greater than 0 volts and withhold the output when the AC power signal has an amplitude around or below 0 volts.

In some cases, an output of the receiver 572 may be based on the output of the optocoupler U2. For example, the receiver 572 may include a digital voltage source V3 that is connected between a collector and an emitter of a photodetector included in the optocoupler U2. In some cases, the digital voltage source V3 may be connected to one or more additional components, such as one or more of a series connection to a resistor R3 or a parallel connection to a capacitor C1. In some cases, the resistor R3 and the capacitor C1 may have respective values (e.g., about 47 kΩ, about 1 μF) that are suitable to provide a output voltage at an output 573 of the receiver 572.

Responsive to the output of the optocoupler U2 (e.g., the received power signal has an amplitude above the forward voltage level), the receiver 572 may provide a first voltage level at the output 573, such as a voltage level of about 0 V. In addition, responsive to the optocoupler U2 withholding the output (e.g., the received power signal has an amplitude below the forward voltage level), the receiver 572 may provide a second voltage level at the output 573, such as a voltage level of about 3.3 V, 5 V, or any other suitable low-voltage digital level. Based on an AC waveform of the received power signal, the receiver 572 may provide an output signal indicating positive or non-positive portions of the waveform. For example, the receiver 572 may provide, to an intelligent lighting system component, an output signal indicating omitted portions of the AC waveform. Based on a pattern of the omitted portions indicated by the receiver 572, such as a pattern indicating a commissioning signal, the intelligent lighting system component may perform an operation, such as an operation related to commissioning.

Figure 6:
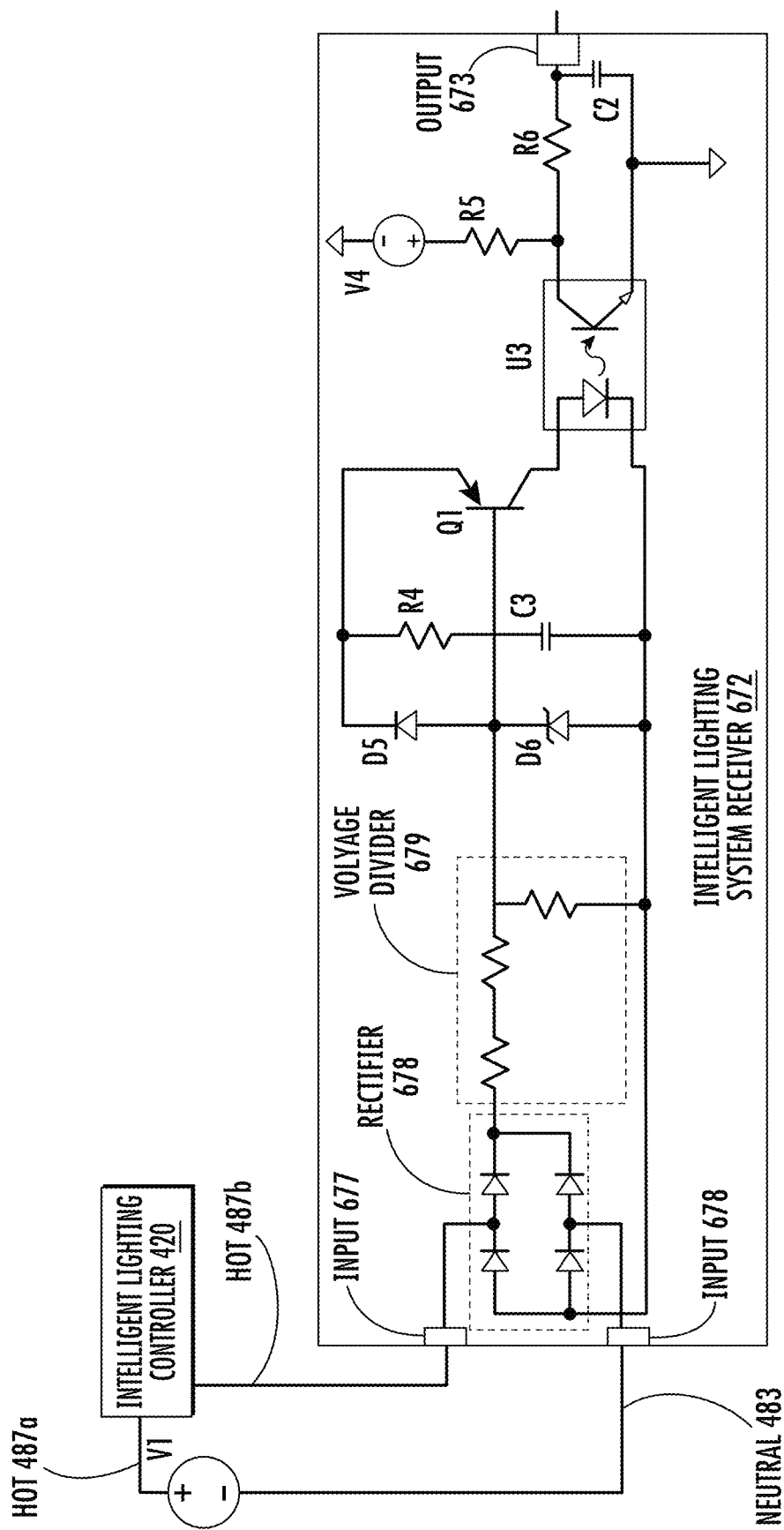
FIG. 6 is a diagram depicting an example configuration of electrical components that may be used to provide an output signal based on zero crossings of a received modified AC power signal, according to certain implementations.

FIG. 6 is a diagram depicting an additional example configuration of electrical components that may be used to receive a modified AC power signal. In FIG. 6 an intelligent lighting system receiver 672 is connected to the intelligent lighting controller 420 and the voltage source V1 included in the AC power source 410, such as described in regards to FIG. 4. In FIG. 6, the neutral line 483 may provide an electrical pathway between the voltage source V1, the intelligent lighting controller 420, and the receiver 672, and the hot line 487*b* may provide an electrical pathway between the intelligent lighting controller 420 and the receiver 672.

In some implementations, the receiver 672 may include an input 677 and an input 678 that are configured to receive an AC power signal. For example, the hot line 487*b* may be connected at the input 677 and the neutral line 483 may be connected at the input 678. The receiver 672 may include a rectifier 678 that is configured to adjust a negative voltage value of the received power signal to a positive voltage value. In addition, the receiver 672 may include a voltage divider 679 that is configured to reduce an amplitude of the received power signal.

The receiver 672 may include one or more sensors that are configured to monitor the received AC power signal for zero crossings, such as an optocoupler U3. In some cases, an input to the optocoupler U3 may be connected to one or more additional components, such as one or more of a bipolar junction transistor ("BJT") Q1, a resistor R4, a capacitor C3, or one or more diodes D5 and D6. In FIG. 6, the resistor R4 may have a value (e.g., about 100Ω) that is suitable to limit current received by the optocoupler U3. In addition, the capacitor C3 may have a value (e.g., about 0.33 g) that is suitable to store energy from the received power signal, such as energy sampled from the output of voltage divider 679. The energy stored by capacitor C3 may be released through the optocoupler U3, BJT Q1, and resistor R4 when the amplitude of the sampled signal is less than a bias voltage (e.g., about 14.3 V) on the base of the BJT Q1. In addition, the diode D5 may provide current blocking at the input(s) of the optocoupler U3 and/or BJT Q1. In some cases, the diode D6 is a Zener diode, and may provide voltage stabilization, such as by clamping the voltage at the base of BJT Q1.

In some implementations, the optocoupler U3 may receive the energy released by capacitor C3, such as when the amplitude of the sampled signal is less than the bias voltage on BJT Q1. The sampled signal may be based on a modified AC power signal, such as an AC signal modified by the FET U1 (e.g., as described in regards to FIG. 4), or on an unmodified AC power signal (e.g., not modified by the intelligent lighting controller 420). The optocoupler U3 may be configured to provide an output based on the released energy. For example, the optocoupler U3 may provide an output when the base voltage on Q1 is lower than voltage across C3 by about 0.7 V. In addition, the optocoupler U3 may withhold the output when the base voltage on Q1 is lower than voltage across C3 (e.g., while C3 is charging). For example, based on the AC power signal received by the receiver 672, the optocoupler U3 may provide an output pulse when the AC power signal has a non-zero amplitude and withhold the output pulse when the AC power signal has a zero amplitude (e.g., a zero-cross pulse that is released at zero crossings of the AC waveform).

In some cases, an output of the receiver 672 may be based on the output of the optocoupler U3. For example, the receiver 672 may include a digital voltage source V4 that is connected at a collector of a photodetector included in the optocoupler U3. In some cases, the digital voltage source V4 may be connected to one or more additional components, such as to a resistor R5. An additional resistor R6 may be connected between an output 673 of the receiver 672 and the collector of the photodetector in optocoupler U3. A capacitor C2 may be connected between the output 673 of the receiver 672 and an emitter of the photodetector in optocoupler U3. In some cases, the resistors R5 and R6 and the capacitor C2 may have respective values (e.g., about 10 kΩ, about 100Ω, about 10 nF) that are suitable to provide a output voltage at the output 673.

Responsive to the output of the optocoupler U3 (e.g., the AC power signal has a non-zero amplitude), the receiver 672 may provide a first voltage level at the output 673, such as a voltage level of about 0 V. In addition, responsive to the optocoupler U3 withholding the output (e.g., the AC power signal has a zero amplitude), the receiver 672 may provide a second voltage level at the output 673, such as a voltage level of about 3.3 V or 5 V (or another suitable low-voltage digital level). Based on an AC waveform of the AC power signal, the receiver 672 may provide an output signal indicating positive or non-positive portions of the waveform. For example, the receiver 672 may provide, to an intelligent lighting system component, an output signal indicating omitted portions of the AC waveform. Based on a pattern of the omitted portions indicated by the receiver 672, such as a pattern indicating a commissioning signal, the intelligent lighting system component may perform an operation, such as an operation related to commissioning.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for commissioning a lighting fixture, the method including operations comprising:
   receiving, at a power input to a switch, a power signal having an alternating current (AC) waveform;
   responsive to a control signal received via a control input of the switch, modifying the power signal, wherein modifying the power signal comprises omitting at least one sequence of portions of the AC waveform, and wherein the omitted sequence of portions of the AC waveform indicates a commissioning signal for the lighting fixture;
   providing, via an AC power input of the lighting fixture, the modified power signal to the lighting fixture, wherein the lighting fixture is configured to enter a commissioning mode responsive to detecting, on the AC power input of the lighting fixture, the omitted sequence of portions of the AC waveform; and
   subsequent to providing the modified power signal to the lighting fixture, providing an additional commissioning signal to the lighting fixture, the additional commissioning signal indicating commissioning information for the lighting fixture.

2. The method of claim 1, wherein the additional commissioning signal is transmitted to the lighting fixture via one or more of an antenna, an additional wired channel, or an additional omitted sequence of portions of the AC waveform.

3. The method of claim 1, further comprising:
   subsequent to providing the additional commissioning signal to the lighting fixture, providing an effect configuration signal to the lighting fixture, wherein the effect configuration signal is transmitted to the lighting fixture via one or more of an antenna, an additional wired channel, or an additional omitted sequence of portions of the AC waveform, and wherein, responsive to the effect configuration signal, the lighting fixture is configured to provide a programmable lighting effect.

4. The method of claim 1, further comprising:

subsequent to providing the modified power signal to the lighting fixture, receiving a verification signal from the lighting fixture; and transmitting, to the lighting fixture and responsive to receiving the verification signal, a verification response.

5. The method of claim 4, wherein:

the verification signal is received via one or more of an antenna or an additional wired channel, and the verification response is transmitted via one or more of the antenna or the additional wired channel.

6. The method of claim 1, wherein the commissioning information indicated by the additional commissioning signal includes a commissioned group of lighting fixtures, wherein the lighting fixture is further configured to modify a commissioned group of the lighting fixture responsive to detecting the additional commissioning signal.

7. The method of claim 1, wherein the lighting fixture is further configured to modify a commissioning behavior responsive to detecting the additional commissioning signal while the lighting fixture is operating in the commissioning mode.

8. The method of claim 1, wherein, subsequent to the omitted sequence of portions of the AC waveform, the power signal includes an unmodified cycle of the AC waveform.

9. A lighting controller comprising:

a microprocessor configured to generate a commissioning signal and an additional commissioning signal for a lighting fixture; and a switch having a power input configured to receive a power signal having an alternating current (AC) waveform, and a control input configured to receive the commissioning signal from the microprocessor, wherein the switch is configured to:

responsive to receiving the commissioning signal, modify the power signal, wherein modifying the power signal comprises omitting at least one sequence of portions of the AC waveform, and provide the modified power signal to the lighting fixture via a power output of the switch, wherein the lighting fixture is configured to enter a commissioning mode responsive to detecting the omitted sequence of portions of the AC waveform, wherein the microprocessor is further configured to:

subsequent to the switch providing the modified power signal to the lighting fixture, providing the additional commissioning signal, the additional commissioning signal indicating commissioning information for the lighting fixture.

10. The lighting controller of claim 9, wherein the additional commissioning signal is transmitted to the lighting fixture via one or more of an antenna, an additional wired channel, or an additional omitted sequence of portions of the AC waveform.

11. The lighting controller of claim 9, wherein the microprocessor is further configured to:

receive, from the lighting fixture, a verification signal, wherein the verification signal is received via one or more of an antenna or an additional wired channel;

generate a verification response; and provide the verification response to the lighting fixture via one or more of the antenna or the additional wired channel.

12. The lighting controller of claim 9, wherein the lighting fixture is further configured to modify a commissioning behavior responsive to detecting the additional commissioning signal while the lighting fixture is operating in the commissioning mode.

13. The lighting controller of claim 9, wherein the commissioning information indicated by the additional commissioning signal includes a commissioned group of lighting fixtures, wherein the lighting fixture is further configured to modify a commissioned group of the lighting fixture responsive to detecting the additional commissioning signal.

14. The lighting controller of claim 9, wherein the modified power signal is provided to the lighting fixture via an AC power input of the lighting fixture.

15. The lighting controller of claim 9, wherein the omitted sequence of portions of the AC waveform has a pattern indicating the commissioning signal.

16. The lighting controller of claim 9, wherein the switch comprises one or more of: a BJT, a SiCFET, a MOSFET, a transistor, an IGBT, a thyristor, or a relay.

17. A lighting fixture, comprising:

a power supply configured to receive a power signal having an alternating current (AC) waveform;

a driver configured to provide a control signal to a light emitter;

a receiver, wherein the receiver is configured to monitor the power signal for an omitted portion of the AC waveform; and a processor, wherein the processor is configured to:

receive, from the receiver, an indication of the omitted portion of the AC waveform;

responsive to determining that the omitted portion of the AC waveform matches a commissioning pattern, enter a commissioning mode;

while operating in the commissioning mode, receive an additional commissioning signal; and responsive to receiving the additional commissioning signal, modify a commissioning behavior of the lighting fixture.

18. The lighting fixture of claim 17, wherein the processor is further configured to determine that the additional commissioning signal indicates a commissioned group of a lighting controller, wherein modifying the commissioning behavior includes modifying a commissioned group of the lighting fixture based on the indicated commissioned group of the lighting controller.

19. The lighting fixture of claim 18, wherein the processor is further configured to:

responsive to entering the commissioning mode, provide a verification signal to a lighting controller via one or more of an antenna or an additional wired channel; and receive, from a lighting controller and via one or more of the antenna or the additional wired channel, a verification response, wherein modifying the commissioned group of the lighting fixture is responsive to receiving the verification response.

20. The lighting fixture of claim 17, wherein the processor is further configured to:

subsequent to entering the commissioning mode, receive an effect configuration signal via one or more of an antenna or an additional wired channel, and configure a programmable lighting effect responsive to receiving the effect configuration signal.

\* \* \* \* \*